US010403944B2

(12) United States Patent
Obrist et al.

(10) Patent No.: US 10,403,944 B2
(45) Date of Patent: Sep. 3, 2019

(54) BATTERY SYSTEM WITH COOLING DEVICE

(71) Applicant: Obrist Technologies GmbH, Lustenau (AT)

(72) Inventors: Frank Obrist, Bregenz (AT); Martin Graz, Lustenau (AT); Joachim Georg Roth, Dornbirn (AT)

(73) Assignee: OBRIST TECHNOLOGIES GMBH, Lustenau (AT)

( * ) Notice: Subject to any disclaimer, the term of this patent is extended or adjusted under 35 U.S.C. 154(b) by 115 days.

(21) Appl. No.: 15/514,278

(22) PCT Filed: Sep. 22, 2015

(86) PCT No.: PCT/EP2015/071629
§ 371 (c)(1),
(2) Date: Mar. 24, 2017

(87) PCT Pub. No.: WO2016/046144
PCT Pub. Date: Mar. 31, 2016

(65) Prior Publication Data
US 2017/0279169 A1 Sep. 28, 2017

(30) Foreign Application Priority Data
Sep. 26, 2014 (DE) .................... 10 2014 114 023

(51) Int. Cl.
*H01M 10/625* (2014.01)
*B60L 11/18* (2006.01)
(Continued)

(52) U.S. Cl.
CPC ........... *H01M 10/625* (2015.04); *B60L 58/26* (2019.02); *H01M 2/1077* (2013.01);
(Continued)

(58) Field of Classification Search
CPC ................... H01M 2/1077; H01M 10/6557
See application file for complete search history.

(56) References Cited

U.S. PATENT DOCUMENTS

| 5,205,348 A | 4/1993 | Tousingnant et al. |
| 9,559,387 B2 | 1/2017 | Obrist et al. |

(Continued)

FOREIGN PATENT DOCUMENTS

| CN | 102623769 A | 8/2012 |
| CN | 103563164 A | 2/2014 |

(Continued)

OTHER PUBLICATIONS

Search Report for German Patent Application No. 10 2014 114 023.0, dated Jun. 23, 2015, 8 pages.
(Continued)

*Primary Examiner* — Stephan J Essex
(74) *Attorney, Agent, or Firm* — Westman, Champlin & Koehler, P.A.

(57) ABSTRACT

The invention relates to a battery system, in particular for a hybrid drive, having a housing, a plurality of battery cells arranged inside the housing and a cooling element, wherein fluid connections and at least one electrical connection are arranged on the housing, said electrical connection being electrically coupled to the battery cells, and wherein the fluid connections comprise at least one coolant inlet and at least one coolant outlet, each of which is fluidically connected to the cooling element. The invention is characterized in that the housing comprises a tubular main body, which is sealed in a fluid-tight manner by a closure cap at each of the opposite end faces thereof, wherein the electrical connection is arranged on a first closure cap and the fluid connections are arranged on a second closure cap. The invention also relates to a motor vehicle having such a battery system.

15 Claims, 2 Drawing Sheets

Figure 1:
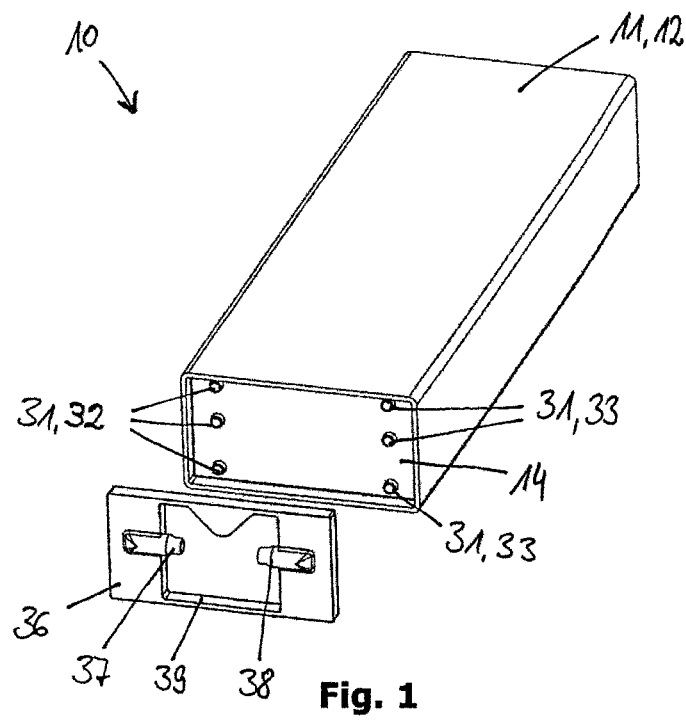

(51) Int. Cl.
  H01M 10/613 (2014.01)
  H01M 10/6557 (2014.01)
  H01M 2/10 (2006.01)
  H01M 2/12 (2006.01)
  H01M 10/62 (2014.01)
  B60L 58/26 (2019.01)

(52) U.S. Cl.
  CPC ....... *H01M 2/1223* (2013.01); *H01M 10/613* (2015.04); *H01M 10/62* (2015.04); *H01M 10/6557* (2015.04); *H01M 2220/20* (2013.01)

(56) References Cited

U.S. PATENT DOCUMENTS

| | | | |
|---|---|---|---|
| 9,660,235 | B2 | 5/2017 | Brenner et al. |
| 9,666,912 | B2 | 5/2017 | Obrist et al. |
| 2011/0206948 | A1 | 8/2011 | Asai et al. |
| 2012/0196157 | A1 | 8/2012 | Krestel et al. |
| 2013/0323545 | A1 | 12/2013 | Gless et al. |
| 2014/0093766 | A1 | 4/2014 | Fees et al. |
| 2014/0162107 | A1 | 6/2014 | Obrist et al. |

FOREIGN PATENT DOCUMENTS

| | | |
|---|---|---|
| CN | 103943913 A | 7/2014 |
| CN | 204067518 U * | 12/2014 |
| DE | 102008034861 A1 | 6/2009 |
| DE | 10 2009 045007 A1 | 3/2011 |
| DE | 102010063423 A1 | 6/2012 |
| DE | 10 2011 102765 A1 | 11/2012 |
| DE | 102012202103 A1 | 8/2013 |
| DE | 10 2012 223562 A1 | 4/2014 |
| EP | 2362463 A2 | 8/2011 |
| EP | 2 744 034 A1 | 6/2014 |
| EP | 2744033 A1 | 6/2014 |
| EP | 2744034 A1 | 6/2014 |
| WO | 2013120770 A1 | 8/2013 |

OTHER PUBLICATIONS

International Search Report (in English) and Written Opinion for International Application No. PCT/EP2015/071629, dated Nov. 17, 2015, 7 pages.

Office Action, including Search Report, for Chinese Patent Application No. 201580052291.1, dated May 29, 2019, 8 pages.

\* cited by examiner

BATTERY SYSTEM WITH COOLING DEVICE

CROSS-REFERENCE TO RELATED APPLICATION

This Application is a Section 371 National Stage Application of International Application No. PCT/EP2015/071629, filed 22 Sep. 2015 and published as WO 2016/046144 A1 on 31 Mar. 2016, in German, the contents of which are hereby incorporated by reference in their entirety.

The invention relates to a battery system, in particular for a hybrid drive, in accordance with the preamble of patent claim 1. The invention also relates to a motor vehicle, in particular a hybrid vehicle, having at least such a battery system. A battery system of the above type is known, for example, from the patent EP 2 744 033 A1 attributable to the applicant.

The aforementioned battery system comprises a housing, wherein inside the housing a plurality of battery cells are arranged. The battery cells are grouped together to form a plurality of layers and are temperature controlled by cooling elements arranged within the housing, which are each in thermally conductive contact with the poles of the batteries. Fluid connections are provided on the housing that are fluidically connected to the cooling elements. The fluid connections comprise firstly at least one coolant inlet and secondly at least one coolant outlet, so that a cooling circuit can be formed, in which a coolant flows through the cooling element. An electrical connection is also arranged on the housing, which is electrically connected to the battery cells.

The battery housing is substantially cuboid shaped and comprises a cover on its end face through which the fluid connections and the electrical connection extend. Such a design is advantageous in terms of the fluid-tightness of the battery housing and the ease of assembly. However, it has been shown that the spatial proximity of the fluid connections and the electrical connection are questionable from a safety point of view, especially given that within the housing of the known battery connection points exist in the cooling system, which in the absence of a fluid seal can lead to a leakage of coolant into the area of the battery housing, in which the electrical connections are also arranged. There is therefore a risk of a short circuit, which in particular in high-voltage systems gives rise to a fire hazard.

The object of the invention is to further develop the above-mentioned battery, in order to improve its operational safety. A further object of the invention is to specify a motor vehicle having such an improved battery.

In accordance with the invention, this object is achieved in relation to the battery by the subject matter of claim 1 and in relation to the motor vehicle by the subject matter of claim 15.

The invention is based on the idea of specifying a battery system, in particular for a hybrid drive, having a housing, a plurality of battery cells arranged within the housing and a cooling element, wherein fluid connections and at least one electrical connection are arranged on the housing. The electrical connection is electrically coupled to the battery cells. The fluid connections comprise at least one coolant inlet and at least one coolant outlet, which are each fluidically connected to the cooling element. In accordance with the invention, the housing has a tubular main body, which is sealed in a fluid-tight manner at each of its opposite end faces by a closure cap. The electrical connection is arranged on a first closure cap. The fluid connections are arranged on a second closure cap.

In the present invention the fluid connections and the electrical connector are consequently spatially separated from each other. In particular, the fluid connections and the electrical connector are arranged on opposite end faces of the housing. Due to the spatial separation of the fluid connections from the electrical connection, the risk of a short circuit and of any subsequent thermal event as a result, such as fire or electrolysis, are efficiently reduced.

To reduce the risk of leaks in the cooling system inside the housing, it is advantageously provided that the cooling element is designed free of connection points. In particular, the cooling element within the housing can be designed free of connection points. In other words, the cooling element, which is arranged inside the housing, comprises no connection points at all. Rather it forms a unit that it can be fluidically connected to other components of the cooling system only at the fluid connections, in particular at the coolant inlet and at the coolant outlet.

In principle one or more cooling elements can be provided within the battery system, in particular inside the housing. Each of the cooling elements preferably comprises a coolant inlet and a coolant outlet. In particular, the cooling element can have a single coolant inlet and a single coolant outlet. The coolant inlet and coolant outlet are preferably each constructed integrally with the cooling element and routed out of the housing through the second closure cap. The cooling element with the coolant inlet and the coolant outlet therefore forms an integral component that is free of connection points, in particular detachable connection points. Thus, the leakage safety of the cooling element is increased and therefore the risk to the supply of the battery system is reduced.

In the battery system according to the invention the battery cells are preferably designed as round cells trained have a height of between 50 mm and 90 mm. In particular, the height of the battery cells can be between 60 mm and 80 mm, in particular approximately 65 mm. Battery cells of this type are particularly well suited to a compact design of the battery system. Such battery cells are also available at a reasonable price, so that the production costs for the battery system as a whole can be reduced.

The battery cells are preferably combined to form cell blocks, wherein between each two cell blocks and/or between each cell block and the housing, a cooling element is arranged. The elements can guide fluid streams that are separate from each other. In other words, the cooling elements can each comprise coolant inlets and coolant outlets that are separate from each other and are routed out of the housing. Each of the cooling elements is therefore arranged within the housing and free of connection points. The only connection points are formed by the coolant inlets and coolant outlets, which are arranged outside of the housing on the second connection cover.

In another preferred embodiment of the battery system according to the invention, at least two coolant inlets and at least two coolant outlets are each fluidically connected to a fluid distributor. The fluid distributor can be arranged on an outer side of the second closure cap.

The fluid distributor preferably connects the coolant inlets to a single inlet nozzle and the coolant outlets to a single outlet nozzle. In other words the fluid distributor enables a plurality of coolant inlets to be grouped together into a single inlet nozzle. This means that coolant, which is circulated through the cooling circuit using a circulation pump, can be distributed evenly via the single inlet nozzle over all coolant inlets.

The same applies to the single outlet nozzle, via which all fluid streams can escape from the coolant outlets together. The fluid distributor thus combines the coolant outlets and directs their fluid flows to the single outlet nozzle. By combining the coolant inlets and coolant outlets by means of the fluid distributor the battery system according to the invention can be integrated particularly easily into a hybrid drive system. All that is required is to connect the inlet nozzle and the outlet nozzle to the cooling circuit in order to provide sufficient cooling of the battery cells.

Preferably, the fluid distributor has a plate-like design and comprises a central recess, wherein the inlet nozzle and the outlet nozzle each protrude into the central recess. It is particularly advantageous if the inlet and outlet nozzles are oriented coaxially with respect to each other. This arrangement of the inlet and outlet nozzles allows a particularly compact design of the battery system.

The coaxial alignment of the inlet nozzle and the outlet nozzle is preferably effected in the plane of the plate of the fluid distributor. The fluid distributor thus has no protruding parts that could be damaged during the assembly of the battery system.

A further optimization of the ease of installation of the battery system is obtained by the fact that the fluid distributor is preferably terminates substantially flush with the surface of a longitudinal end of the tubular main body. The fluid distributor is thus integrated in a compact battery system unit and protected against damage.

In an advantageous variant of the battery system a receiving space is arranged between the battery cells, in particular between the cell blocks, and the first closure cap. The receiving space preferably contains all electrical connection means for connecting the electrical connection to the cell blocks and/or to electronic components arranged inside the housing. The receiving space therefore integrates all of the electrical connections between the cell blocks and the electrical connection, and those between electronic components arranged inside the housing and the electrical connection. These are therefore spatially separated from the fluid connections on the second closure cap, wherein in particular the cell blocks function as a separator.

The concentration of the electrical connections at one longitudinal end of the housing serves both to provide increased operational safety, due to the spatial separation from the fluid connections, and also to increase the ease of assembly, since for electrically connecting the electrical connection to the cell blocks or electronic components, the housing needs only to be accessible from one side.

The arrangement of the fluid connections and the electrical connection at opposite end faces of the hermetically sealed housing reduces the risk of short circuit as a result of leaks at the connection points in the fluid circuit. In order to also protect against condensation forming inside the enclosure, in other preferred embodiments of the invention it is provided that on the first closure cap, spaced apart from the electrical connection, a valve is arranged having a gas-permeable and fluid-tight membrane. The valve enables on the one hand an air exchange and a pressure balance between an adequate airflow to the inside of the housing and the environment, and on the other hand due to the fluid-tight membrane, prevents any ingress of liquid. At the same time the valve acts as a pressure relief valve, so that in the event of overpressure that can cause damage, an abrupt balance of pressure can be established between the interior of the housing and the environment.

The valve can also comprise an air drying medium, which is effective inside the housing. In other words the valve, which is preferably secured to an outer side of the first closure cap, is equipped with an air drying medium that acts on the interior of the housing. The air drying medium is thus arranged in such a way that it absorbs moisture from the interior of the housing, thus preventing the formation of condensation inside the housing.

The valve, in particular the air drying medium and/or the membrane, is/are preferably replaceable. In the context of a service plan, the valve can be replaced for example at regular intervals, preferably annually, in order to ensure that the air drying medium is effective in preventing condensate formation. The air drying medium may, for example, comprise zeolite, which absorbs moisture.

The absorption capacity of the air drying medium degrades in the course of time, so that it is recommended to replace at least the air drying medium. The membrane itself can also lose its effect in the course of time, so that replacement of this is also recommended. To this end, the valve should preferably also be replaceable. As the valve is preferably secured to the outer side of the first closure cap, replacement of the valve is simple and requires just a few manual operations.

A secondary aspect of the invention relates to a motor vehicle, in particular a hybrid vehicle, having at least one battery system as previously described. In principle, a plurality of battery systems of the above type can also be arranged in a motor vehicle and preferably electrically coupled to each other. The individual battery systems can also share a common circulation pump for the cooling system. Motor vehicles within the meaning of the present invention are not limited to land vehicles, but also include airborne and water-based vehicles.

Figure 2:
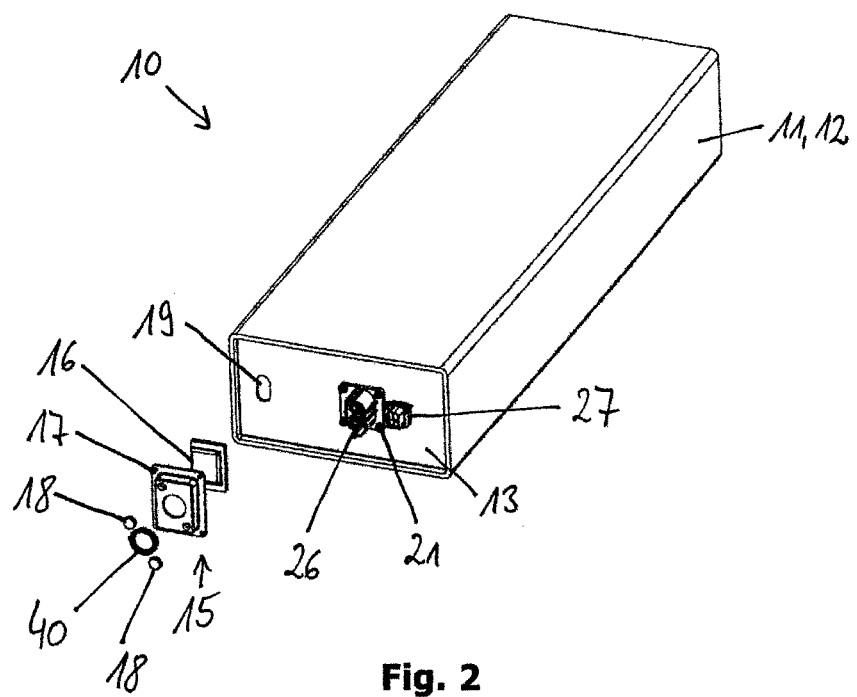
Figure 3:
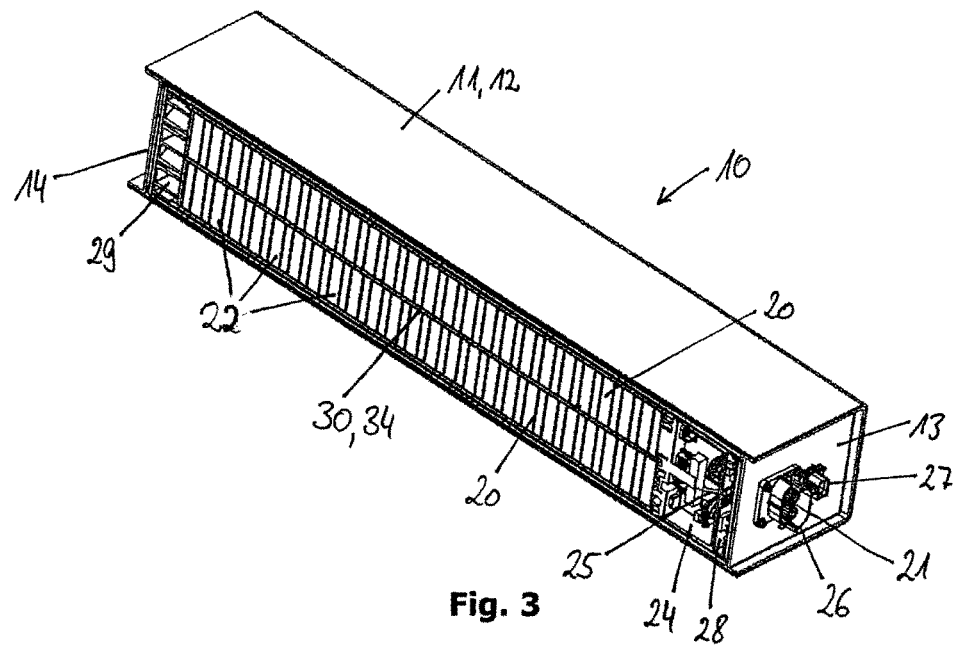
Figure 4:
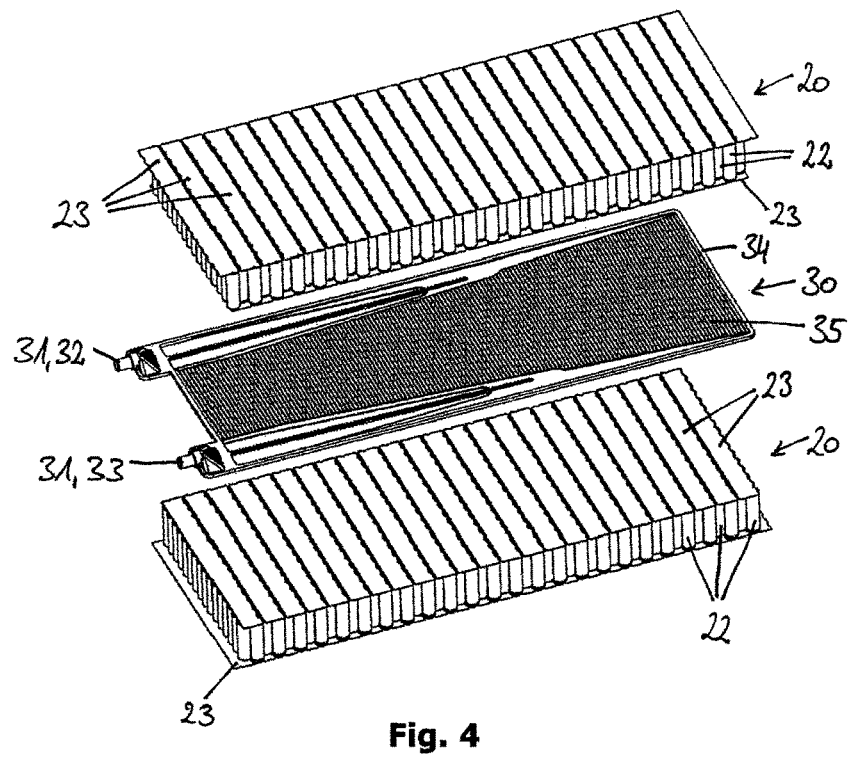

The invention is described in greater detail in the following by reference to the attached schematic drawings. These show:

FIG. 1 a perspective front view of the battery system according to the invention having a fluid distributor, which has been removed from the housing;

FIG. 2 a perspective rear view of the battery system as shown in FIG. 1 with a valve, whose individual parts are shown in the exploded view;

FIG. 3 a perspective longitudinal sectional view of the battery system as shown in FIG. 1; and FIG. 4 a perspective view of the internal structure of the battery system as shown in FIG. 1 with two cell blocks and a cooling element.

The attached figures show a battery system 10, which is suitable in particular for a hybrid drive. The battery system 10 can be advantageously be used as an energy accumulator for a hybrid vehicle, wherein the battery system is preferably coupled to an electric motor that is used to propel the vehicle forwards. Possible vehicles, in particular motor vehicles, include land vehicles, aircraft or water-borne vessels.

The battery system 10 in general comprises a housing 11, which comprises a tubular main body 12. The tubular main body 12 has two open end faces and a substantially rectangular cross-section. The main body 12 is therefore designed as a rectangular tube. On the end faces the main body 12 is closed off by closure caps 13, 14, wherein in the present application a distinction is made between a first closure cap 13 and a second closure cap 14. The main body 12 and the closure caps 13, 14 can be formed from steel, preferably with a wall thickness of 3 mm.

Inside the housing 11, battery cells 22 and at least one cooling element 30 are arranged. The battery cells 22 are preferably combined to form cell blocks 20, wherein one cooling element is arranged between each two cell blocks 20 and/or between each cell block 20 and the housing 11.

On the outside of the housing 11, fluid connections 31 and at least one electrical connection 21 are provided. The electrical connection 21 is electrically coupled to the battery cells 22. The fluid connections 31 comprise at least one coolant inlet 32 and one coolant outlet 33, wherein the coolant inlet 32 and the coolant outlet 33 are fluidically connected to the cooling element 30. Taking into account the operational safety of the battery system 10, it is provided that the electrical connection 21 is arranged, in particular fixed, to the first closure cap 13 and the fluid connections 31 are arranged, in particular fixed, to the second closure cap 14. This enables is a spatial separation of fluid connections 31 and electrical connection 21.

FIG. 1 shows the battery system with the housing 11, in particular the fluid connection side of the housing 11 being shown. The housing 11 comprises the main body 12 and the closure caps 13, 14, which are inserted into the main body 12. The closure caps 13, 14 are preferably welded to the main body 12, providing a fluid-tight seal. A plurality of fluid connections 31 extend through the second closure cap 14, three coolant inlets 32 and three coolant outlets 33 being specifically provided. The coolant inlets 32 and the coolant outlets 33 are fixed to the second closure cap 14, for example by means of a seal.

The battery system preferably comprises a fluid distributor 36, which is fluidically connected to each of at least two coolant inlets 32 and at least two coolant outlets 33. The fluid distributor 36 can be arranged on an outer side of the second closure cap 14. The fluid distributor 36 preferably connects the coolant inlets 32 to a single inlet nozzle 37 and the coolant outlets 33 to a single outlet nozzle 38. An example of such a fluid distributor is illustrated in FIG. 1. The fluid distributor 36 includes receiving jacks, which are arranged congruent with the fluid port connections 31 on the fluid distributor 36. Hence the fluid distributor 36 can be placed onto the second closure cap 14, thus creating the fluidic connection to the fluid connections 31. Within the fluid distributor 36, distributor channels are formed that extend from the inlet nozzle 37 to the coolant inlets 32 or from the coolant outlets 33 to the outlet nozzle 38.

The fluid distributor 36 can have a plate-like design. The outlet nozzle 38 and the inlet nozzle 37 are preferably aligned in the plane of the plate of the fluid distributor 36. The inlet nozzle 37 and the outlet nozzle 38 then extend into a central recess 39 of the fluid distributor 36, resulting in a particularly compact design of the battery system 10. The fact that the fluid distributor 36 preferably terminates substantially flush with the longitudinal end surface of the tubular main body 12 also contributes to this compact design.

The central recess is substantially rectangular in shape and has a triangular shaped header, the peak of which is equidistantly spaced from the inlet nozzle 37 and the outlet nozzle 38. The tip comes to rest substantially between the inlet nozzle 37 and the outlet nozzle 38.

The inlet nozzle 37 and the outlet nozzle 38 can be arranged coaxially with respect to each other. As a result the lengths of the connecting channels on the inlet side and on the outlet side of the fluid distributor 36 are identical, which is advantageous for allowing the flow of coolant through the cooling elements 30. The fluid distributor 36 is preferably fixedly connected to the housing 11, so that to connect the battery system 10 to a hybrid drive only the inlet nozzle 37 and the outlet nozzle 38 need to be connected to a cooling system to ensure the cooling inside the battery system 10.

The coolant flows through the inlet nozzle 37 and the distribution channels arranged in the fluid distributor 36 to the coolant inlets 32 and thus reaches a plurality of cooling elements 30. A stream of coolant flows through the cooling elements 30, so that they cool the battery cells 22 inside the battery system 10. The coolant heated in the cooling elements 30 leaves the housing 11 via the coolant outlets 33 and the outlet nozzle 38 of the fluid distributor 36.

While FIG. 1 shows a front side of the battery system 10, FIG. 2 shows a rear side of the same battery system 10. The electrical connection 21 is arranged on the rear side of the battery system 10. The electrical connection 21 is in particular secured to the first closure cap 13, which is preferably inserted into the tubular main body 12 and welded to the main body in a fluid-tight manner.

The electrical connection 21 in this case comprises a power socket 26 and an electronics socket 27. The power socket 26 is coupled to the battery cells 22 inside the housing 11 and is used to tap off the electrical energy stored within the battery cells 22, or to charge the battery cells 22. Next to the power socket 26 the electronics socket 27 is arranged, which is coupled to electronic components inside the housing 11 and is used for signal and/or data transfer between the battery system 10 and a set of vehicle electronics, such as a bus system. The electrical connection 21, in particular the power socket 26 and the electronics socket 27, is/are each fitted with seals in order to ensure the fluid-tightness of the housing 11.

The first closure cap 13 also comprises a valve opening 19, which is spaced apart from the electrical connection 21. The valve opening 19 can have a substantially oval shape. A round or square design is also possible. On the valve opening 19 a valve 15 is seated, the components of which are preferably arranged completely outside of the housing 11.

The valve 15 comprises a valve frame 17, in which an air drying medium 16 is held. The air drying medium 16 can comprise zeolite. Preferably, the air drying medium 16 rests directly on the valve opening 19, so that the air drying medium 16 is effective inside the housing. The air space inside the housing 11 is therefore constantly cleared of moisture. The valve also forms an overpressure protection, by creating a pressure balance between the inside of the housing and the environment.

The valve frame 17 comprises in particular an opening into which a pressure relief valve in the form of a rubber stopper 40 is inserted. The pressure relief valve 40 is held in the opening such that it comes loose when the pressure within the housing 11 exceeds a predetermined threshold.

The membranes 18 are also arranged in the valve frame. Each of the two membranes 18 is preferably fluid-tight and gas-permeable. A suitable membrane 18 can comprise, for example, a textile. The membrane 18 ensures a sufficient exchange of air in the housing 11 and at the same time prevents the ingress of moisture.

The valve 15, in particular the air drying medium 16, the relief valve 40 and/or the membrane 18, can be replaceable. For example, the valve 15 be replaced at regular intervals, preferably annually, as part of a service plan. The absorption capacity of the air drying medium 16 degrades with the passing of time, so that it is recommended to replace at least the air drying medium 16. The membrane 18 itself can also lose its effect over time, so that replacement of this is also recommended. As the valve 15 is preferably secured to the outer side of the first closure cap 13, replacement of the valve 15 is simple and requires just a few manual operations.

FIG. 3 shows the internal structure of the battery system 10. Within the housing 11, in particular two cells blocks 20 are arranged, which consist of a plurality of battery cells 22 that are interconnected in parallel and serially with one another. Between the cell blocks 20 a cooling element 30 is arranged, which is in thermally-conductive contact with the poles of the battery cells 22. Further cooling elements 30 can also be arranged between the housing 11 and the cell blocks 20.

Between the battery cells 22, or the cell blocks 20, and the first closure cap 13, a receiving space 24 can be arranged in which connection cables 25 are located. The receiving space 24 preferably contains all electrical connection means for connecting the electrical connection 21 to the cell 20 blocks and/or to electronic components, for example a control circuit board 28, arranged inside the housing 11. The latter are therefore spatially separated from the fluid connections 31 on the second closure cap 14, wherein in particular the cell blocks 20 can function as a separator. The concentration of the electrical connections at one longitudinal end of the housing 11 serves both to provide increased operational safety, due to the spatial separation from the fluid connections 31, and also to increase the ease of assembly, since to electrically connect the electrical connection 21 to the cell blocks 20 or electronic components, the housing 11 needs only to be accessible from one side.

The fluid connections 31 are preferably designed integrally with the cooling element 30 and extend through the second closure cap 14. In order to support the fluid connections 13, between the cell blocks 20 and the second closure cap 14 a support structure 29 is provided, which on the one hand the stabilizes the fluid connections 31 and on the other hand, the housing 31.

FIG. 4 shows the arrangement of the cells blocks 20 with the intermediate cooling element 30 in detail. The cell blocks 20 are each formed from a plurality of battery cells, which are preferably designed as round cells. The round cells are arranged in multiple rows, the rows being staggered and tightly packed with gaps in between. The individual battery cell 22 of a row are electrically connected to each other in parallel. To achieve this, contact plates are 23 provided that are welded to the upper and lower poles of the battery cells 22. The contact plates 23 fixed on opposite sides of the battery cells 22 are staggered, so that the individual rows of battery cells 22 are coupled to one another in series.

The battery cells 22, or round cells, preferably have a height of between 50 mm and 90 mm. In particular, the height of the battery cells 22 can be between 60 mm and 80 mm, in particular approximately 65 mm. Particularly suitable battery cells 22 for the battery system 10 are those of type 18650. Such battery cells 22 are also available at a reasonable price, so that the production costs for the battery system as a whole can be reduced.

The cooling element 30 extends between the two cell blocks 20. The cooling element 30 is formed by a pouch 34 in the interior of which a plurality of flow channels 35 are arranged. The structure of the flow channels 35 is adjusted in such a way that a uniform fluid flow through the cooling element 30 is obtained. The fluid connections 31 are arranged at a longitudinal end of the pouch 34. The fluid connections 31 are preferably formed as an integral part of the pouch 34. Therefore no detachable fluid connections exist between the fluid connections 31 and the pouch 34, which increases the leakage protection. The fluid connections 31 comprise a coolant inlet 32 and a coolant outlet 33. The coolant thus flows into the coolant inlet 32, flows through the flow channels 35 and leaves the pouch 34 via the coolant outlet 33. The pouch 34 has flexible outer walls, so that due to the fluid pressure within the cooling element 30 and any other pressure contacting measures that may be present inside the battery system 10, a good thermally conductive contact is guaranteed between the cooling element 30 and the cell blocks 20.

The battery system 10 is preferably designed as a high-voltage battery system 10. The spatial separation of the electrical connection 21 and the fluidic connections 31 ensures that the high-voltage region is separated from the of the coolant passage region. This increases the operational safety of the battery system 10. Additional safety is achieved by the fact that all detachable connection points in the cooling circuit and also the fluid distributor 36 are arranged outside the housing 11. Specifically, the fluid connections 31 protrude beyond the cells blocks 20 and extend through the support structure 29 and the second closure cap 14. The cooling element 30 itself can be designed free of connection points within the housing 11 of the battery system 10. The only connection points are formed by the fluid connections 30, which are arranged outside housing 11 on the second closure cap 14.

LIST OF REFERENCE NUMERALS 10 battery system
11 housing
12 main body
13 first closure cap
14 second closure cap
15 valve
16 air drying medium
17 valve frame
18 membrane
19 valve opening
20 cell block
21 electrical connection
22 battery cell
23 contact plate
24 receiving space
25 connecting cable
26 power jack
27 electronics socket
28 control circuit board
29 support structure
30 cooling element
31 fluid connection
32 coolant inlet
33 coolant outlet
34 pouch
35 flow channel
36 fluid distributor
37 inlet nozzle
38 outlet nozzle
39 recess
40 pressure relief valve

The invention claimed is:

1. A battery system having, in particular for a hybrid drive, having a housing, a plurality of battery cells arranged inside the housing and a cooling element wherein fluid connections and at least one electrical connection are arranged on the housing, said electrical connection being electrically coupled to the battery cells, and wherein the fluid connections comprise at least one coolant inlet and at least one coolant outlet, each of which is fluidically connected to the cooling element, characterized in that
   the housing comprises a tubular main body, which is sealed in a fluid-tight manner by a closure cap at each of the opposite end faces thereof, wherein the electrical connection is arranged on a first closure cap and the fluid connections are arranged only on a second closure cap.

2. The battery system according to claim 1, characterized in that
the cooling element is designed free of connection points.

3. The battery system according to claim 1, characterized in that
one coolant inlet and a coolant outlet are each designed integrally with the cooling element and are routed out of the housing through the second closure cap.

4. The battery system according to claim 1, characterized in that
the battery cells are designed as round cells and have a height of between 50 mm and 90 mm.

5. The battery system according to claim 1, characterized in that
the battery cells are combined into cell blocks, wherein between each of two cell blocks and/or between each cell block and the housing, one cooling element is fitted, and wherein the cooling elements each guide fluid streams that are separate from each other.

6. The battery system according to claim 1, characterized in that
at least two coolant inlets and at least two coolant outlets are fluidically connected to a fluid distributor, which is arranged on the outer side of the second closure cap and which connects the coolant inlets to a single inlet nozzle and the coolant outlets to a single outlet nozzle.

7. The battery system according to claim 6, characterized in that
the fluid distributor has a plate-like design and comprises a central recess, wherein the inlet nozzle and the outlet nozzle each protrude into the central recess.

8. The battery system according to claim 6, characterized in that
the inlet nozzle and the outlet nozzle are aligned coaxially with respect to each other.

9. The battery system according to claim 6, characterized in that
the fluid distributor is connected to the second closure cap in such a way that the fluid distributor terminates substantially flush with the surface of a longitudinal end of the tubular main body.

10. The battery system according to claim 1, characterized in that
between the battery cells and the first closure cap a receiving space is arranged, in which all electrical connection means are arranged for connecting the electrical connection to the cell blocks and/or to electronic components arranged within the housing.

11. The battery system according to claim 1, characterized in that
on the first closure cap, spaced apart from the electrical connection, a valve is arranged that has a gas-permeable and fluid-tight membrane.

12. The battery system according to claim 11, characterized in that
the valve comprises an air drying medium, which acts inside the housing.

13. The battery system according to claim 1, characterized in that
the valve comprises a pressure relief valve.

14. The battery system according to claim 1, characterized in that
the valve is replaceable.

15. A motor vehicle having at least one battery system according to claim 1.

* * * * *

UNITED STATES PATENT AND TRADEMARK OFFICE
CERTIFICATE OF CORRECTION

PATENT NO. : 10,403,944 B2
APPLICATION NO. : 15/514278
DATED : September 3, 2019
INVENTOR(S) : Frank Obrist et al.

Page 1 of 1

It is certified that error appears in the above-identified patent and that said Letters Patent is hereby corrected as shown below:

In the Claims

In Column 8, Lines 56-57, at Claim 1, delete ", in particular for a hybrid drive, having"

Signed and Sealed this
Seventeenth Day of March, 2020

Andrei Iancu
*Director of the United States Patent and Trademark Office*